(12) United States Patent
Lee

(10) Patent No.: US 8,480,141 B2
(45) Date of Patent: Jul. 9, 2013

(54) HOOD STAY APPARATUS FOR ENGINE ROOM IN HEAVY CONSTRUCTION EQUIPMENT

(75) Inventor: Taek Woo Lee, Gimhae-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 966 days.

(21) Appl. No.: 12/270,244

(22) Filed: Nov. 13, 2008

(65) Prior Publication Data

US 2009/0134302 A1    May 28, 2009

(30) Foreign Application Priority Data

Nov. 28, 2007 (KR) .................. 10-2007-0121986

(51) Int. Cl.
*E05C 17/44* (2006.01)
*E05C 17/04* (2006.01)

(52) U.S. Cl.
USPC .... 292/338; 292/200; 292/262; 292/DIG. 14; 292/DIG. 15; 248/351; 49/379

(58) Field of Classification Search
USPC ............ 292/338, 250, 89, 305, 302, 86, 166, 292/200, 48, 262, 268, DIG. 14, DIG. 15; 248/351; 49/379
See application file for complete search history.

(56) References Cited

U.S. PATENT DOCUMENTS

| | | | | |
|---|---|---|---|---|
| 1,241,192 A | * | 9/1917 | Bruder | 292/83 |
| 1,303,441 A | * | 5/1919 | Wilton | 217/60 C |
| 1,464,345 A | * | 8/1923 | Tomford | 292/276 |
| 2,514,095 A | * | 7/1950 | Schreiber | 248/352 |
| 4,629,146 A | * | 12/1986 | Lymons | 244/53 R |
| 4,925,223 A | * | 5/1990 | Craft | 292/339 |
| 5,215,074 A | * | 6/1993 | Wilson et al. | 126/214 R |
| 5,228,737 A | * | 7/1993 | Zimmerman | 296/76 |
| 5,306,053 A | * | 4/1994 | Gurusami et al. | 292/278 |
| 5,570,493 A | * | 11/1996 | Gulick | 27/18 |
| 5,853,060 A | * | 12/1998 | Chao et al. | 180/69.2 |
| 6,453,511 B2 | * | 9/2002 | Sato | 16/360 |
| 6,609,583 B2 | * | 8/2003 | Schillaci et al. | 180/69.21 |
| 6,932,396 B2 | * | 8/2005 | Masseth et al. | 292/338 |
| 2006/0260202 A1 | * | 11/2006 | Shin | 49/379 |

FOREIGN PATENT DOCUMENTS

JP          58004673 A  *  1/1983

* cited by examiner

*Primary Examiner* — Carlos Lugo
(74) *Attorney, Agent, or Firm* — Ladas & Parry LLP

(57) ABSTRACT

A hood stay apparatus for an engine room in heavy construction equipment. The hood stay apparatus can safely keep an engine hood in an open state even if an external force is abruptly generated due to vibration, wind, and the like. The hood stay apparatus can also facilitate an opening/closing operation of the engine hood.

3 Claims, 5 Drawing Sheets

HOOD STAY APPARATUS FOR ENGINE ROOM IN HEAVY CONSTRUCTION EQUIPMENT

CROSS-REFERENCE TO RELATED APPLICATION

This application is based on and claims priority from Korean Patent Application No. 10-2007-0121986, filed on Nov. 28, 2007 in the Korean Intellectual Property Office, the disclosure of which is incorporated herein in its entirety by reference.

BACKGROUND OF THE INVENTION

1. Field of the Invention

The present invention relates to a hood stay apparatus for an engine room in heavy construction equipment. More particularly, the present invention relates to an improved hood stay apparatus for an engine room in heavy construction equipment, which can safely keep an engine hood in an open state even if an external force is abruptly generated due to vibration, wind, and the like, and can facilitate the closing operation of the engine hood.

2. Description of the Prior Art

As illustrated in FIG. 1, a general engine hood stay apparatus in a conventional heavy construction equipment, such as an excavator, a wheel loader, and the like, includes a rod guide 8 installed in the interior of a hood 1, a hood hinge 2, and a hood frame 3 to form a specified guide rail extending from a front side 3a of the hood to a rear side 3b of the hood, the rod guide 8 having a catch groove 8a provided in a rear rail catch part; a stay rod 5 pivotably installed in the interior of the hood frame 3 and having a rod guide 8 and a hinge part 7 provided at both ends of the stay rod 5; and a hinge bracket 4 formed on one side of the hood 1 to pivotably fix the hinge part 7 provided at one end of the stay rod 5; wherein, in the case of opening the hood, a sliding part 6 of the stay rod 5 is inserted into the catch groove 8a of the rod guide 8 and the hood 1 is kept in an inclined state at a specified angle, while in the case of closing the hood, the caught stay rod 5 is manually pulled to the front side 3a of the hood and the sliding part 6 is moved along the guide rail of the rod guide 8 to open/close the hood.

If an external force is generated due to vibration of the equipment, wind, and the like, in a typical process of repairing the interior of the engine room, the sliding part of the stay rod may easily secede from the catch groove of the guide rod due to the shaking of the hood in an inclined state, and thus the hood may be dropped at a moment an operator cannot expect to cause a safety accident to the operator and damage of component parts.

In order to solve this problem, there have been attempts to increase the resistant performance against an external force by lowering the inclination of the stay rod through separate forming of a stepped incline on a guide surface of the rod guide or addition of a folding connection part to the center point of the stay rod. However, this requires a strengthened hood frame or a complicated structure, and thus the manufacturing efficiency is lowered or the manufacturing cost is increased.

SUMMARY OF THE INVENTION

Accordingly, the present invention has been made to solve the above-mentioned problems occurring in the prior art while advantages achieved by the prior art are maintained intact.

One object of the present invention is to provide a hood stay apparatus for an engine room in heavy construction equipment, which can make a stay rod supported by a locking stopper and thus can safely keep an engine hood in an open state even if an external force is generated due to vibration, wind, and the like.

Another object of the present invention is to provide a hood stay apparatus for an engine room in heavy construction equipment, which can make an operator easily release a hood from the front of the hood when the operator closes the hood, and thus can seek the operator's safety in repair operations.

In order to accomplish these objects, there is provided a hood stay apparatus for an engine room in heavy construction equipment, having a stay rod fixed to one side of a hood frame to support an open state of a hood, according to an embodiment of the present invention, which includes a rod guider provided with a guide rail movably coupled to a slider of the stay rod, and fixedly installed on one side of the hood frame so that the slider of the stay rod slides along the guide rail; a support rod guider provided with a support rail formed adjacent to a rear catch part of the guide rail, and installed on an upper part of the guide rail so that one side of an outer periphery of the stay rod is inserted into the support rail when the hood is opened; a control lever provided with a yoke coupled to a handle and one side of a pulling member, the handle being rotatably fixed to an upper part of the hood to generate a pulling force; and a locking stopper provided with a pulling arm coupled to the other side of the pulling member and a locking arm formed to extend from the pulling arm so as to rotate to be adjacent to the support rail, and selectively opening and closing the support rail when the locking arm is rotated by the pulling force generated by the control lever.

A hinge part may be formed on the locking stopper, a support protrusion may be formed to be radially apart from the locking arm around the hinge part, and an elastic member for rotating the locking arm may be fixedly installed on the support protrusion.

A support groove part may be formed on one side of the support rod guider to support the pulling arm, and rotation of the pulling arm may be limited by the support groove part.

The support rail may be formed to project to an outer side of a vertical part of the rod guider for a specified distance L2, and a rear catch part of the support rail may be formed to project to a rear side of the rear catch part of the guide rail for a specified distance L1.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
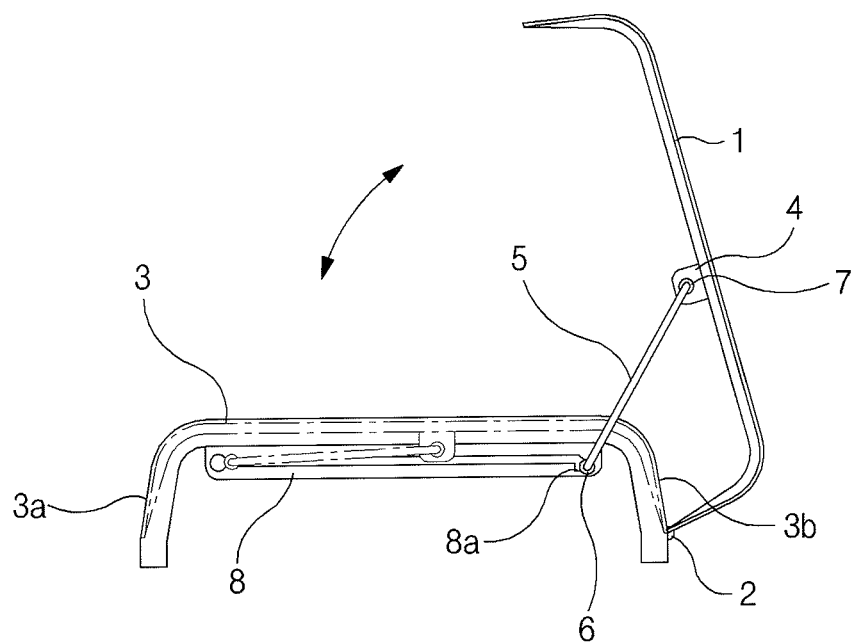
FIG. 1 is a side view schematically illustrating the open/close state of a hood provided with a conventional hood stay apparatus for an engine room in heavy construction equipment.
Figure 2:
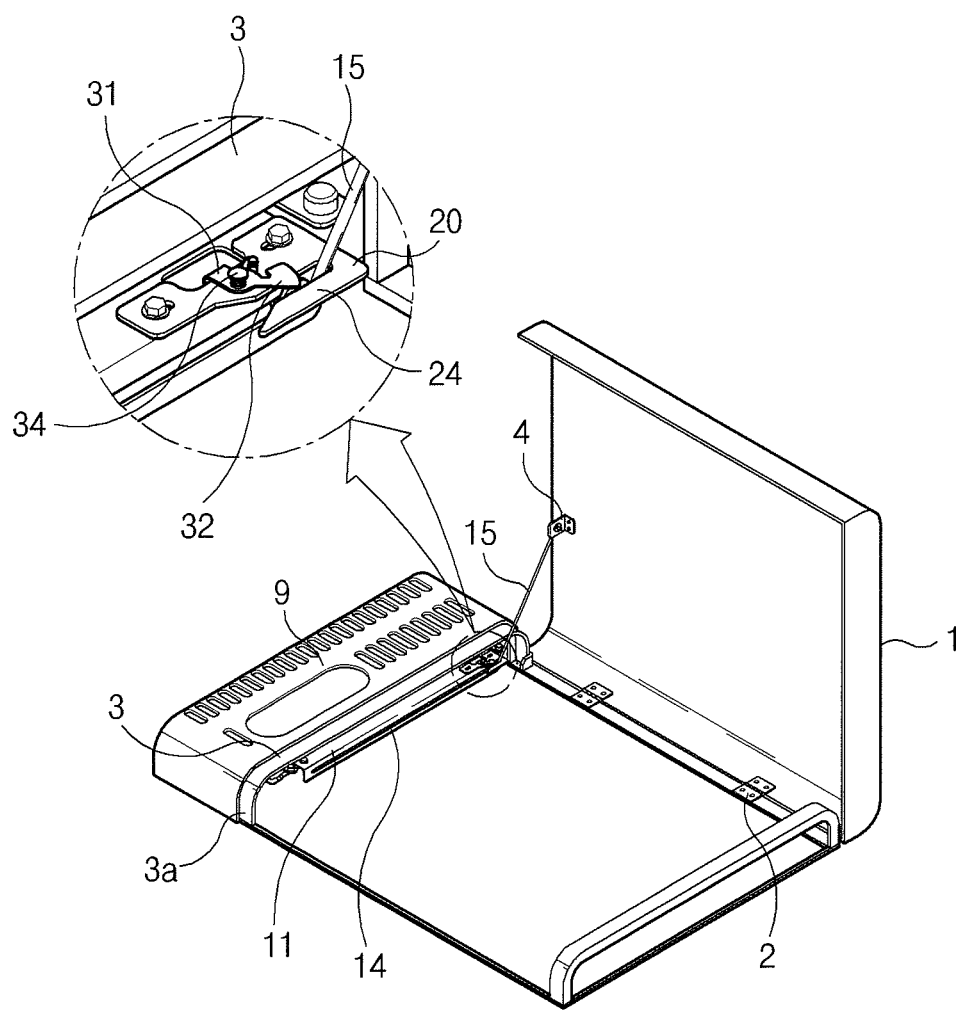
FIG. 2 is an exploded perspective view of a hood stay apparatus for an engine room in heavy construction equipment according to an embodiment of the present invention.
Figure 3:
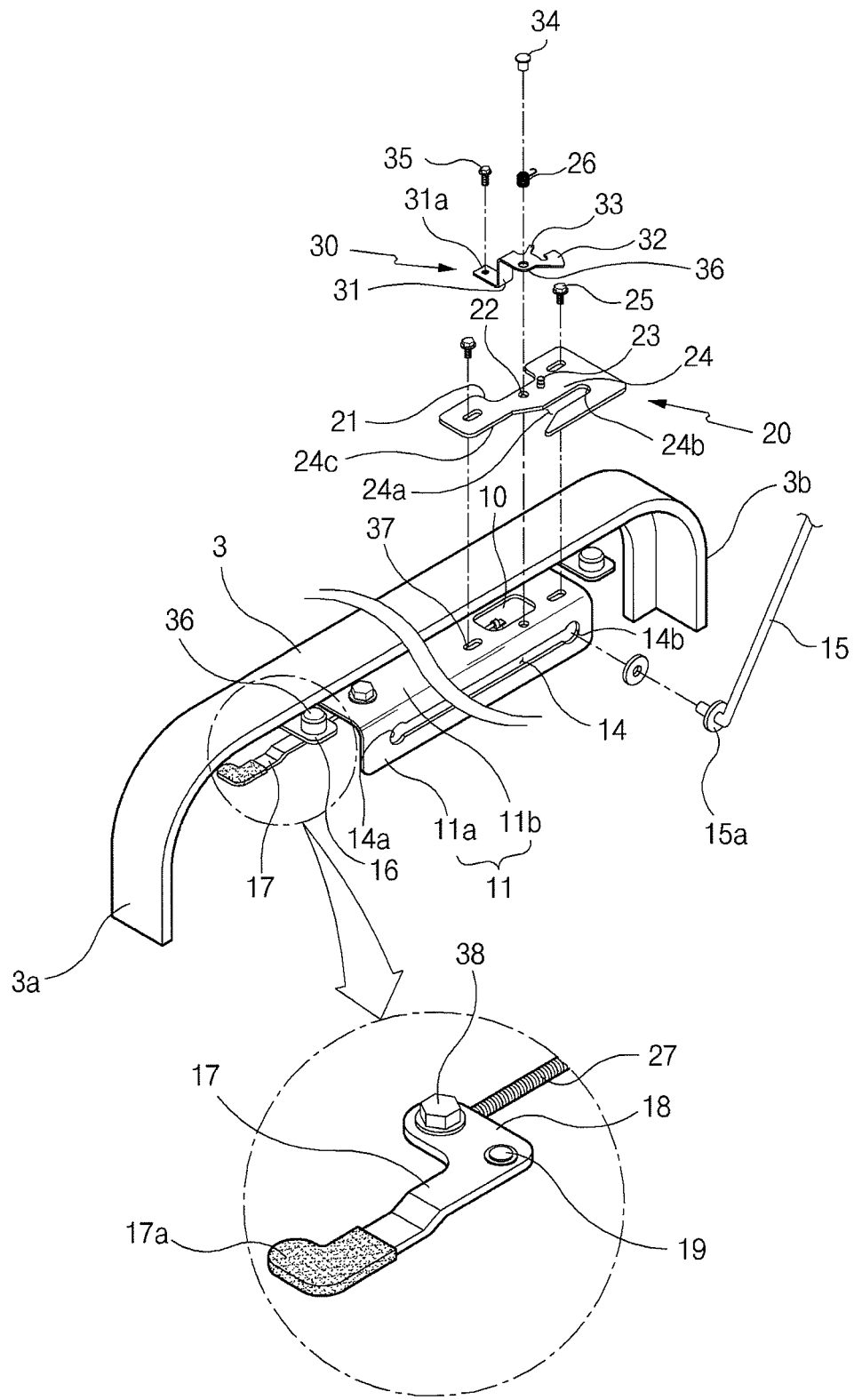
FIG. 3 is a perspective view schematically illustrating the open state of an engine room hood in heavy construction equipment according to an embodiment of the present invention.
Figure 4:
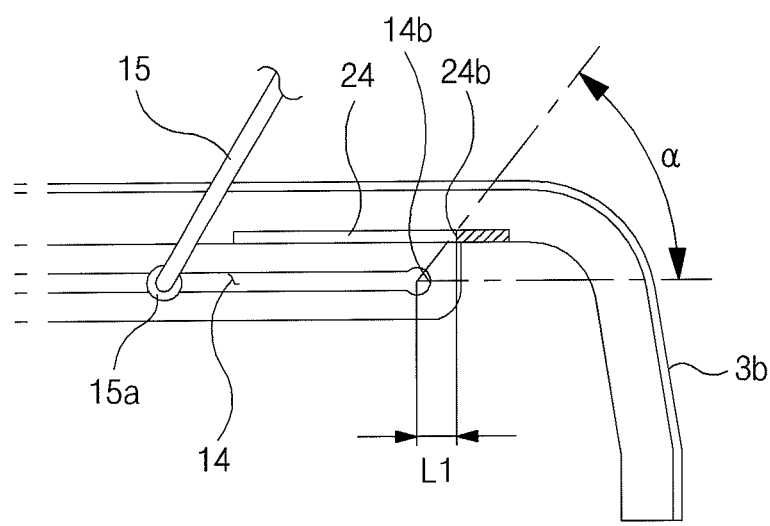
FIG. 4 is an exemplary view illustrating a stay rod sliding a guide rail and a support rail to open a hood according to an embodiment of the present invention.
Figure 5A:
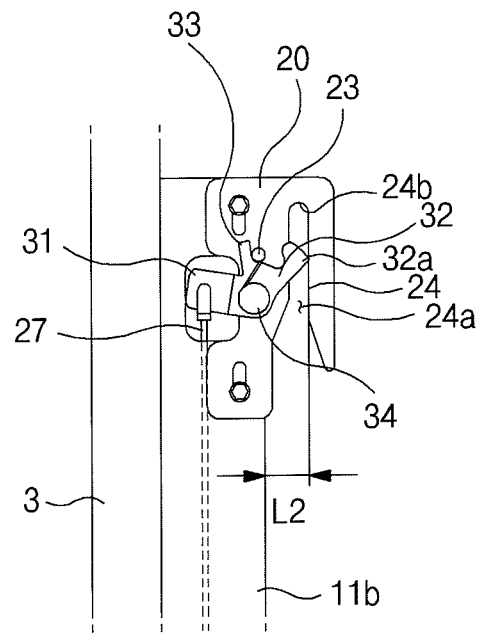
FIG. 5A is a schematic plan view illustrating the state of the locking arm and the stay rod of FIG. 4 before collision between them.
Figure 5B:
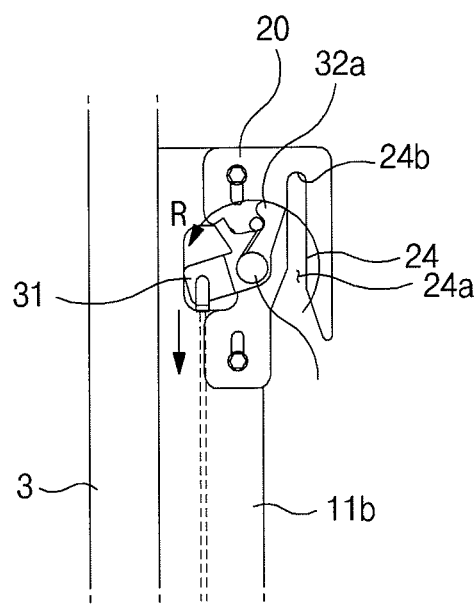
FIG. 5B is a schematic plan view illustrating the state of the locking arm and the stay rod of FIG. 4 after collision between them.

FIG. 2 is an exploded perspective view of a hood stay apparatus for an engine room in heavy construction equipment according to an embodiment of the present invention. FIG. 3 is a perspective view schematically illustrating the open state of an engine room hood in heavy construction equipment according to an embodiment of the present invention, and FIG. 4 is an exemplary view illustrating a stay rod sliding a guide rail and a support rail to open a hood according to an embodiment of the present invention. FIG. 5A is a schematic plan view illustrating the state of the locking arm and the stay rod of FIG. 4 before collision between them, and FIG. 5B is a schematic plan view illustrating the state of the locking arm and the stay rod of FIG. 4 after collision between them.

In the drawings, the reference numeral "11" denotes a rod guider, "20" denotes a support rod guider, and "30" denotes a locking stopper.

A hood stay apparatus for an engine room in heavy construction equipment, having a stay rod 15 fixed to one side of a hood frame 3 to support an open state of a hood, according to an embodiment of the present invention, includes a rod guider 11 provided with a guide rail 14 movably coupled to a slider 15a of the stay rod 15, and fixedly installed on one side of the hood frame 3 so that the slider 15a of the stay rod 15 slides along the guide rail 14; a support rod guider 20 provided with a support rail 24 formed adjacent to a rear catch part 14b of the guide rail 14, and installed on an upper part of the guide rail 14 so that one side of an outer periphery of the stay rod 15 is inserted into the support rail 24 when the hood 1 is opened; a control lever 17 provided with a yoke 18 coupled to a handle 17a and one side of a pulling member 27, the handle 17a being rotatably fixed to an upper part of the hood 1 to generate a pulling force; and a locking stopper 30 provided with a pulling arm 31 coupled to the other side of the pulling member 27 and a locking arm 32 formed to extend from the pulling arm 31 so as to rotate to be adjacent to the support rail 24, and selectively opening and closing the support rail 24 when the locking arm 32 is rotated by the pulling force generated by the control lever 17.

When the hood is opened, the support rail 24 slidably guides one side of an outer periphery of the stay rod 15. The locking arm 32 is rotated around a hinge pin 34 by the pulling force, and selectively opens and closes the support rail 24. Also, the stay rod 15 is fixed to a hinge bracket 4 formed on one side of the hood 1 that is rotated from the hood frame 3 to an upper side by a hood hinge 2, and supports the open state of the hood.

A hinge part 36 is formed on the locking stopper 30, a support protrusion 33 is formed to be radially apart from the locking arm 32 around the hinge part 36, and an elastic member for supporting the locking arm 32 on the support protrusion 33 is fixedly installed on the support protrusion 33. A pulling arm 31 and the locking arm 32 are fixed by the hinge pin 34 to rotate in the same direction.

A support groove part 21 is formed on one side of the support rod guider 20 to support the pulling arm 31, and rotation of the pulling arm 31 may be limited by the support groove part 21.

The elastic member 26 serves to elastically support the locking arm 32 so that the locking arm 32 is rotated toward an inlet 24a of the support rail 24 when the pulling force from the control lever 17 is released.

When the rotation of the pulling arm 31 is limited, the rotation of the locking arm 32, which occurs when the locking arm 32 and one side of the stay rod 15 collide with each other, is also limited.

In an embodiment of the present invention, as illustrated in FIG. 4, the support rod guider 20 is fixedly installed adjacent to the rear catch part 14b of the guide rail 14, and preferably, the rear catch part 24b of the support rail 24 is installed to be closer to the rear side 3b of the hood than the rear catch part 14b of the guide rail 14 so that the stay rod 15 is inclined to the rear 3b of the hood when the slider 15a of the stay rod 15 is safely placed on the rear catch part 14b of the guide rail 14.

As illustrated in FIG. 4, the rear catch part 24b of the support rail 24 is installed to be closer to the rear side 3b of the hood than the rear catch part 14b of the guide rail 14, and a distance L1 between the respective catch parts 14b and 24b, i.e. the projection range of the rear catch part 24b of the support rail 24, may be variously set as the inclination angle α of the stay rod is changed.

The projection range L1 of the rear catch part 24b of the support rail 24 is to limit the range of an angle α at which the stay rod 15 is inclined to the rear hood side 3b of the hood frame 3. It should be understood that, when one side of the outer periphery of the inclined stay rod 15 is slightly moved to the rear hood side 3b of the hood frame 3 along the support rail 24 by the external force and thus the stay rod 15 intends to slide to the rear hood side 3a along the guide rail 14 and the support rail 24, one side of the outer periphery of the stay rod 15 may collide with the locking arm 32.

In an embodiment of the present invention, as illustrated in FIG. 2, the rod guider 11 is composed of a horizontal part 11b bent downward at one front end thereof to be "⏋"-shaped and fixed to the hood frame 3, and a vertical part 11a extending downward at one front end of the horizontal part 11b, and the guide rail 14, which is an elongated groove, is formed on the vertical part 11a.

When the support rod guider 20 is mounted on the upper part of the rod guider 11, the support rail 24 of the support rod guider 20 is formed to project to the outer side of the vertical part 11b of the rod guider 11 for a specified distance L2, and the rear catch part 24b of the support rail 24 is formed to project to the rear side of the rear catch part 14b of the guide rail 14.

On the other hand, the control lever 17 may be fixedly installed on the front end part of the rod guider 11 so that it pulls the pulling member 27 at the front end part 14a of the guide rail 14.

On one side of the rod guider 11, a guide through hole 10 is formed, and the pulling arm 31 is coupled to one side of the pulling member 27 through the guide hole 10.

Also, the locking arm 32 is composed of a cam part 32a that is in contact with one side of the outer periphery of the stay rod 15, and the cam part 32a serves to support one side of the outer periphery of the stay rod 15 so that the stay rod does not secede from the support rail 24 when an external force is applied to the hood 1 in a state that the hood 1 is fully opened.

In an embodiment of the present invention, the locking arm 23 is installed on one side of the support rod guider 20 by a hinge pin 34 so that, when the sliding part 12 of the stay rod 15 slides toward the rear catch part 14b of the guide rail 14 to open the hood, a rotary orbit R, on which one side of the outer periphery of the stay rod 15 collides with the cam part 23a, is formed.

The inlet 24a of the support rail 24 is formed to extend from a guide part 24c that guides one side of the outer periphery of the stay rod 15, which moves from the front hood side 3a to the rear hood side 3b, to the inside of the support rail 24.

Also, the support rod guider 20 is provided with a support pin 23 that supports one side of the elastic member 26.

In the present invention, the pulling member 27 may be formed of a wire, and the rod guider 11 may be installed on one side of a hood chassis 9. It is possible to install a guide member or a separate secession prevention part on one side of the outer periphery of the stay rod 15 to facilitate the entrance and slide movement of the stay rod 15 onto the support rail 24.

In the description of the present invention, the unexplained reference numeral "19" denotes a hinge hole of the yoke, "36" denotes a yoke hinge fixing member, "37" denotes a fastening hole for mounting the support rod guider, and "38" denotes a fastening member for attaching the pulling member to the yoke.

Hereinafter, the operation of the hood stay apparatus for an engine room in heavy construction equipment according to an embodiment of the present invention will be described.

Typically, when the hood 1 is rotated from the front side 30 to an upper side around the hood hinge 2, the slider 15a moves from the front catch part 14a to the rear catch part 14b along the guide rail 14. In this case, the stay rod 15 moves to open the hood as it is inclined in a state that it is fixed to the hinge bracket 4 of the hood 1.

As illustrated in FIG. 4, when the slider 15a of the stay rod 15 is approximately adjacent to the rear catch part 14b of the guide rail 14, the stay rod 1 approaches a position where the hood is fully opened at a preset inclination angle α.

In the process of reaching the position where the hood is fully opened, the stay rod 15 is kept approximately at the inclination angle α in the support rod guider 20 by the rotating and support operations of the locking arm 32 formed on the locking stopper 30 and the pulling arm 31.

That is, as illustrated in FIGS. 5A and 5B, when the slider 15a of the stay rod 15 moves to approach the rear catch part 14b of the guide rail 14, the locking arm 32 that closes the inlet 24a of the support rail 24 by the elasticity collides with one side of the outer periphery of the main body of the stay rod 15. In this case, the locking arm 32 is rotated along the preset rotary orbit R.

Finally, if the elasticity is overcome by the force of the operator, the locking arm 32 is rotated to secede from the support rail 24, and the stay rod 15 approaches the rear end part 24b of the support rail 24, passing through the cam part 32a formed on the front end part of the locking arm 32. At this moment, the locking arm 32 is reversely rotated by the elastic member 26 to close the inlet 24a of the support rail 24.

The external force, being applied to the hood 1, due to vibration of the equipment, wind, or the like, is transferred to the cam part 32a of the locking arm 32, and acts as a moment of rotation to open the inlet 24a of the support rail 24, e.g. a moment or rotation to rotate the locking arm 32 clockwise. In this case, the side surface of the pulling arm 31 formed in a body with the locking arm 32 becomes in contact with the side surface of the support groove part 21 to support the moment of rotation.

Accordingly, the locking arm 32 and the cam part 32a of the locking arm 32 support one side of the outer periphery of the stay rod 15 to keep the inlet 24a of the support rail in a closed state, and thus the hood is kept in an open state even if the external force is generated.

On the other hand, in the case of close the hood 1, the operator rotates the control lever 17 from the front part 3a of the hood, the pulling member 27 connected to the yoke 18 is pulled to the front part 3a of the hood, and the pulling arm 31 is rotated counterclockwise as shown in the drawing.

In this case, the locking arm 32 formed in a body with the pulling arm 31 is rotated counterclockwise in the same manner as the pulling arm 31 around the hinge pin 34, and thus the inlet 24a of the support rail is opened, so that the stay rod 15 secedes from the inlet 24a of the support rail 24 to close the hood 1, and moves to the front part 3a of the hood along the guide rail 14.

In the embodiments of the present invention, although not illustrated in the drawing, a secession prevention part or a guide member may be separately formed on one side of the outer periphery of the stay rod 15. In this case, when the hood 1 is abruptly closed by the external force, such as vibration, wind, and the like, the secession of the stay rod 15 is prevented by the rotation and support operations of the locking stopper 30 composed of the locking arm 32 and the pulling arm 31 in the same manner as described above, and thus the detailed description thereof will be omitted.

As described above, according to the hood stay apparatus for an engine room in heavy construction equipment according to the present invention, even if an external force, such as vibration, wind, or the like, is abruptly applied to the hood, the stay rod does not secede from the support rail, but is safely kept in the support rail by the rotation and support operations of the locking stopper composed of the locking arm and the pulling arm. In the case of closing the hood, the operator can easily release the hood from the front of the hood.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A hood stay apparatus for an engine room in heavy construction equipment, the hood stay apparatus comprising:
   a stay rod having one end fixed to one side of a hood frame to support an open state of a hood;
   a rod guider provided with a guide rail fixedly installed on one side of the hood frame so that a slider on an opposed end of the stay rod slides along the guide rail;
   a support rod guider provided with a support rail attached adjacent to a rear catch part of the guide rail, and attached on an upper part of the guide rail so that one side of an outer periphery of the stay rod is guided into the support rail when the hood is opened;
   a control lever provided with a yoke coupled to a handle and one side of a pulling member, the handle being rotatably fixed to an upper part of the hood to generate a pulling force; and
   a locking stopper provided with a pulling arm coupled to the other side of the pulling member and a locking arm formed to extend from the pulling arm so as to rotate to be adjacent to the support rail, and selectively opening and closing the support rail when the locking arm is rotated by the pulling force generated by the control lever;

wherein a hinge part is formed on the locking stopper, a support protrusion is formed to be radially apart from the locking arm around the hinge part, and an elastic member for rotating the locking arm is fixedly installed on the support protrusion.

2. The hood stay apparatus of claim 1, wherein a support groove part is formed on one side of the support rod guider to support the pulling arm, and rotation of the pulling arm is limited by the support groove part.

3. The hood stay apparatus of claim 1, wherein the support rail projects to an outer side of a vertical part of the rod guider for a specified distance L2, and a rear catch part of the support rail is formed to project to a rear side of the rear catch part of the guide rail for a specified distance L1.

* * * * *